United States Patent
Chae et al.

(10) Patent No.: US 11,751,026 B2
(45) Date of Patent: *Sep. 5, 2023

(54) METHOD AND APPARATUS FOR TRANSCEIVING MESSAGES FROM V2X TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

This patent is subject to a terminal disclaimer.

(21) Appl. No.: 17/122,965

(22) Filed: Dec. 15, 2020

(65) Prior Publication Data

US 2021/0144528 A1    May 13, 2021

Related U.S. Application Data

(63) Continuation of application No. 16/748,767, filed on Jan. 21, 2020, now Pat. No. 10,887,739, which is a
(Continued)

(51) Int. Cl.
*H04W 4/44*        (2018.01)
*H04L 5/00*        (2006.01)
(Continued)

(52) U.S. Cl.
CPC ............. *H04W 4/44* (2018.02); *H04L 5/0044* (2013.01); *H04L 5/0053* (2013.01);
(Continued)

(58) Field of Classification Search
CPC ............... H04W 4/44; H04W 72/0406; H04W 72/0446; H04L 5/0044; H04L 5/0053;
(Continued)

(56) References Cited

U.S. PATENT DOCUMENTS 5,448,759 A    9/1995 Krebs et al.
9,961,487 B1 *  5/2018 Miao ................. H04W 4/029
(Continued)

FOREIGN PATENT DOCUMENTS

CN    102804723    11/2012
CN    103370974    10/2013
(Continued)

OTHER PUBLICATIONS

U.S. Appl. No. 15/759,808, Office Action dated May 1, 2019, 11 pages.
(Continued)

*Primary Examiner* — Michael J Moore, Jr.
(74) *Attorney, Agent, or Firm* — LEE, HONG, DEGERMAN, KANG & WAIMEY PC

(57) ABSTRACT

One embodiment of the present invention relates to a method for a terminal transmitting a message in a wireless communication system, comprising the steps of: generating a message; and transmitting, from a resource sectioned on a time axis, control information for the message and the message when the size of the message is larger than a predetermine value, and transmitting, from a resource sectioned on a frequency axis, the control information for the message and the message when the size of the message is smaller than the predetermined value.

14 Claims, 24 Drawing Sheets

Related U.S. Application Data continuation of application No. 15/759,808, filed as application No. PCT/KR2016/010416 on Sep. 19, 2016, now Pat. No. 10,575,150.

(60) Provisional application No. 62/341,043, filed on May 24, 2016, provisional application No. 62/339,935, filed on May 22, 2016, provisional application No. 62/335,673, filed on May 12, 2016, provisional application No. 62/251,092, filed on Nov. 4, 2015, provisional application No. 62/218,561, filed on Sep. 14, 2015.

(51) Int. Cl.
*H04L 25/03* (2006.01)
*H04W 72/20* (2023.01)
*H04W 72/0446* (2023.01)

(52) U.S. Cl.
CPC ...... *H04L 5/0094* (2013.01); *H04L 25/03866* (2013.01); *H04W 72/0446* (2013.01); *H04W 72/20* (2023.01); *H04L 5/0051* (2013.01)

(58) Field of Classification Search
CPC ............. H04L 5/0094; H04L 25/03866; H04L 5/0051
See application file for complete search history.

(56) References Cited

U.S. PATENT DOCUMENTS

| | | | | |
|---|---|---|---|---|
| 10,389,502 | B2* | 8/2019 | Baghel | H04L 1/0072 |
| 10,582,552 | B2* | 3/2020 | Kim | H04W 76/14 |
| 2013/0293394 | A1 | 11/2013 | Rubin | |
| 2014/0328329 | A1* | 11/2014 | Novlan | H04W 56/0015 |
| | | | | 370/336 |
| 2015/0271846 | A1* | 9/2015 | Kowalski | H04W 72/14 |
| | | | | 370/329 |
| 2015/0365942 | A1* | 12/2015 | Niu | H04W 24/06 |
| | | | | 370/330 |
| 2016/0073408 | A1* | 3/2016 | Sartori | H04W 72/0453 |
| | | | | 370/329 |
| 2016/0234045 | A1* | 8/2016 | Lindoff | H04L 25/03866 |
| 2016/0295624 | A1* | 10/2016 | Novlan | H04L 67/12 |
| 2016/0381670 | A1* | 12/2016 | Kim | H04L 5/0064 |
| | | | | 370/329 |
| 2017/0019882 | A1* | 1/2017 | Nimbalker | H04W 74/02 |
| 2017/0230996 | A1* | 8/2017 | Li | H04W 72/1284 |
| 2017/0289733 | A1* | 10/2017 | Rajagopal | H04L 5/0087 |
| 2017/0290020 | A1* | 10/2017 | Aiba | H04B 1/3816 |
| 2018/0124682 | A1* | 5/2018 | Chae | H04L 1/00 |
| 2018/0139724 | A1* | 5/2018 | Loehr | H04W 72/02 |
| 2018/0146494 | A1* | 5/2018 | Khoryaev | H04W 76/14 |
| 2018/0176892 | A1* | 6/2018 | Kim | H04W 52/386 |
| 2018/0206260 | A1* | 7/2018 | Khoryaev | H04W 72/1289 |
| 2018/0255444 | A1* | 9/2018 | Chae | H04W 4/44 |
| 2018/0279242 | A1* | 9/2018 | Kwak | H04L 5/0048 |
| 2019/0007957 | A1 | 1/2019 | Chae et al. | |
| 2019/0029006 | A1* | 1/2019 | Wang | H04W 76/27 |
| 2019/0058980 | A1* | 2/2019 | Zhang | H04L 1/00 |
| 2019/0090250 | A1* | 3/2019 | Lee | H04W 72/02 |
| 2020/0162869 | A1 | 5/2020 | Chae et al. | |
| 2021/0282165 | A1* | 9/2021 | Lee | H04W 72/1263 |

FOREIGN PATENT DOCUMENTS

| | | | |
|---|---|---|---|
| CN | 103404217 | 11/2013 | |
| CN | 103975620 | 8/2014 | |
| CN | 104756434 | 7/2015 | |
| EP | 3432657 | 1/2019 | |
| KR | 1020140054673 | 5/2014 | |
| WO | 2015065015 | 5/2015 | |
| WO | WO-2017026975 A1 * | 2/2017 | ........... H04L 5/0023 |
| WO | 2018038416 | 3/2018 | |

OTHER PUBLICATIONS

U.S. Appl. No. 16/748,767, Office Action dated Mar. 16, 2020, 25 pages.
PCT International Application No. PCT/KR2016/010416, Written Opinion of the International Searching Authority dated Dec. 28, 2016, 20 pages.
Huawei, et al., "Impact of SA transmissions", 3PP TSG RAN WG1 Meeting #82, R1-154361, Aug. 2015, 3 pages.
European Patent Office Application Serial No. 16846920.3, Office Action dated Mar. 25, 2021, 7 pages.
State Intellectual Property Office of the People's Republic of China Application Serial No. 201680053283.3, Office Action dated Apr. 7, 2021, 7 pages.
European Patent Office Application Serial No. 16846920.3, Search Report dated Mar. 26, 2019, 10 pages.
Ericsson, "On Scrambling of D2D Physical Channels", 3GPP TSG RAN WG1 Meeting #76, R1-140777, XP050736278, Feb. 2014, 6 pages.

* cited by examiner

FIG. 5
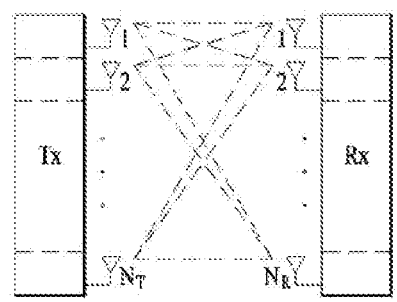
(a)
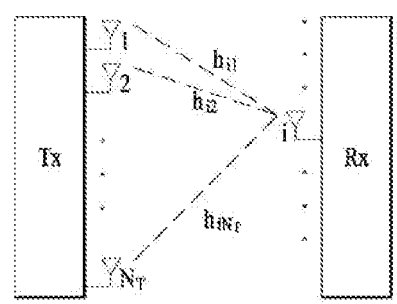
(b)

FIG. 8
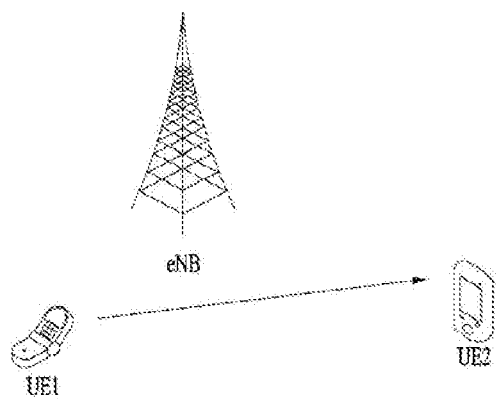
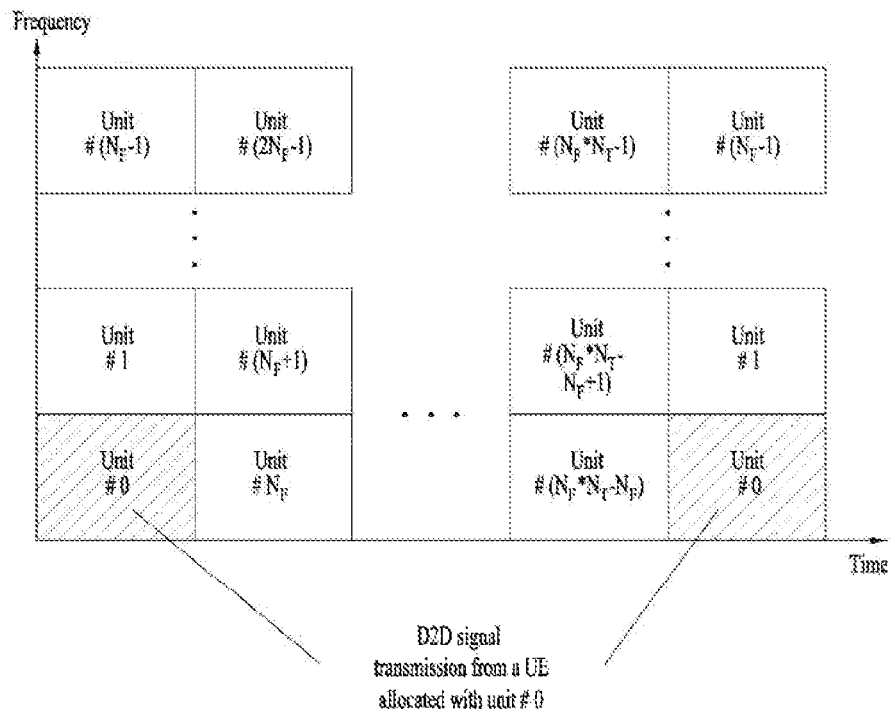

(a) with CI

METHOD AND APPARATUS FOR TRANSCEIVING MESSAGES FROM V2X TERMINAL IN WIRELESS COMMUNICATION SYSTEM

CROSS-REFERENCE TO RELATED APPLICATIONS

This application is a continuation of U.S. patent application Ser. No. 16/748,767, filed on Jan. 21, 2020, which is the continuation of U.S. patent application Ser. No. 15/759,808, filed on Mar. 13, 2018, now U.S. Pat. No. 10,575,150, which is the National Stage filing under 35 U.S.C. 371 of International Application No. PCT/KR2016/010416, filed on Sep. 19, 2016, which claims the benefit of U.S. Provisional Application No. 62/218,561, filed on Sep. 14, 2015, 62/251,092, filed on Nov. 4, 2015, 62/335,673, filed on May 12, 2016, 62/339,935, filed on May 22, 2016, and 62/341,043, filed on May 24, 2016, the contents of which are all hereby incorporated by reference herein in their entirety.

TECHNICAL FIELD

Following description relates to a wireless communication system, and more particularly, to a method for a V2X (vehicle to everything) UE to transmit control information and a message and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly without an evolved Node B (eNB). D2D communication may cover UE-to-UE communication and peer-to-peer communication. In addition, D2D communication may be applied to Machine-to-Machine (M2M) communication and Machine Type Communication (MTC).

D2D communication is under consideration as a solution to the overhead of an eNB caused by rapidly increasing data traffic. For example, since devices exchange data directly with each other without an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

Currently, discussion on V2X communication associated with D2D communication is in progress. The V2X communication corresponds to a concept including V2V communication performed between vehicle UEs, V2P communication performed between a vehicle and a UE of a different type, and V2I communication performed between a vehicle and an RSU (roadside unit).

DISCLOSURE OF THE INVENTION

Technical Task

A technical task of the present invention is to provide a method of configuring various resource structures capable of transmitting control information and a message transmitted by a V2X UE.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a message, which is transmitted by a user equipment (UE) in a wireless communication system, includes the steps of generating a message, and if a size of the message is greater than a predetermined value, transmitting control information for the message and the message in a resource distinguished on a time axis, and if the size of the message is less than the predetermined value, transmitting the control information for the message and the message in a resource distinguished on a frequency axis.

To further achieve these and other advantages and in accordance with the purpose of the present invention, according to a different embodiment, a user equipment (UE) in a wireless communication system includes a transmitter and a receiver, and a processor, the processor configured to generate a message, the processor, if a size of the message is greater than a predetermined value, configured to transmit control information for the message and the message in a resource distinguished on a time axis, the processor, if the size of the message is less than the predetermined value, configured to transmit the control information for the message and the message in a resource distinguished on a frequency axis.

If the control information and the message are transmitted in the resource distinguished on the frequency axis, the control information for the message can be transmitted from at least one or more regions among a plurality of preconfigured candidate regions.

The preconfigured candidate regions may consist of slots on the time axis and the preconfigured number of resource blocks (RBs) on the frequency axis.

A position of a candidate region in which the control information is included in a second slot can be restricted by a position of a candidate region in which the control information is included in a first slot.

A candidate region in which the control information is included in a second slot and a candidate region in which the control information is included in a first slot can be positioned at a different frequency band.

A center RB of the entire frequency band may not be included in a plurality of the preconfigured candidate regions.

The message is transmitted in a region selected from the group consisting of a region within +/−K1 RBs, a region within +K2 RBs, and a region within −K3 RBs from an RB in which the control information is transmitted and the K1, the K2, and the K3 may correspond to natural numbers.

The message may correspond to a V2X (vehicle to everything) message.

The control information can include at least one selected from the group consisting of an ID, a UE type indicating a type of the UE among a P-UE, a V-UE, and an RSU, a hopping flag, and RA (resource allocation).

If the control information does not include the ID, a DMRS base sequence, CS (cyclic shift), OCC, and a scrambling sequence can be generated using one selected from the group consisting of the UE type, the hopping flag, and the RA.

A message larger than the predetermined value may correspond to a periodic message and a message smaller than the predetermined value may correspond to an event triggered message.

Advantageous Effects

According to the present invention, it is able to transmit control information and a message according to a message size using a different multiplexing scheme without a loss on a cubic metric.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;

FIG. 8 is a diagram for an example of a D2D resource pool for performing D2D communication;

BEST MODE

Mode for Invention

Figure 1:
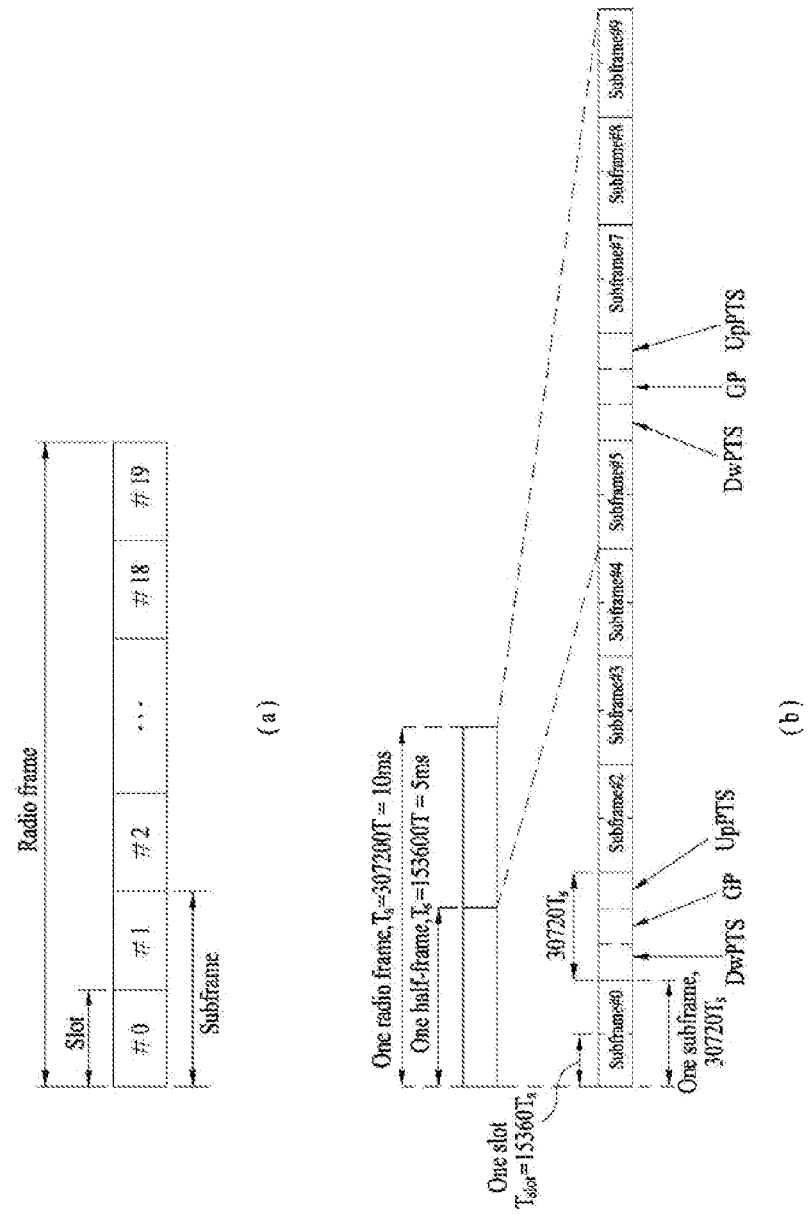
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
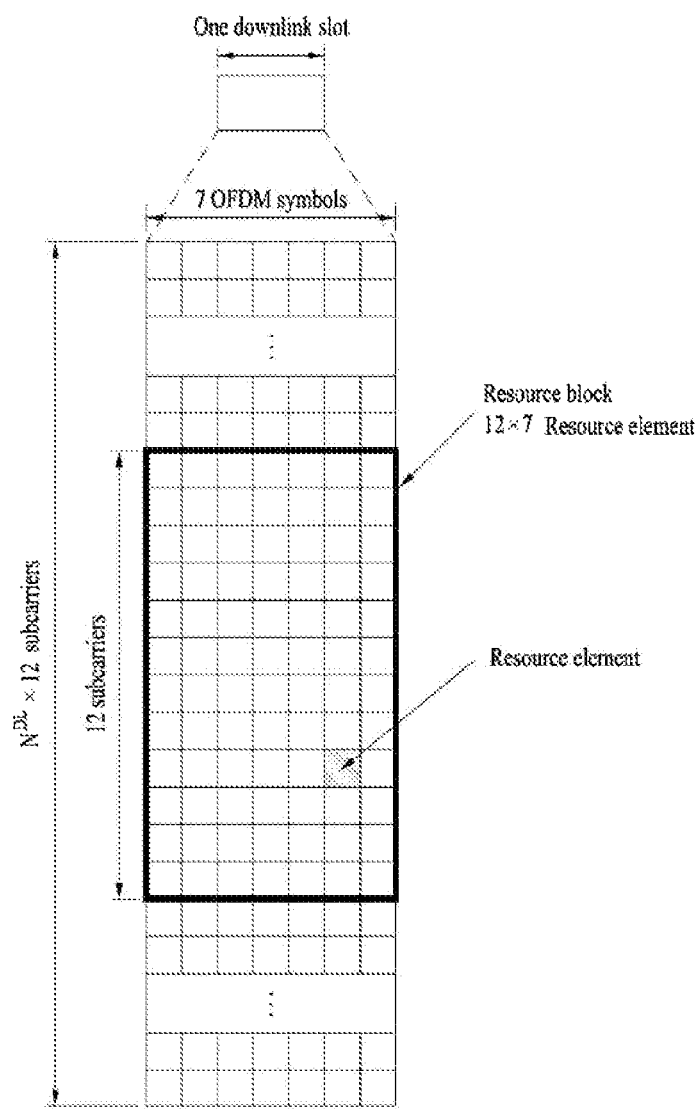
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
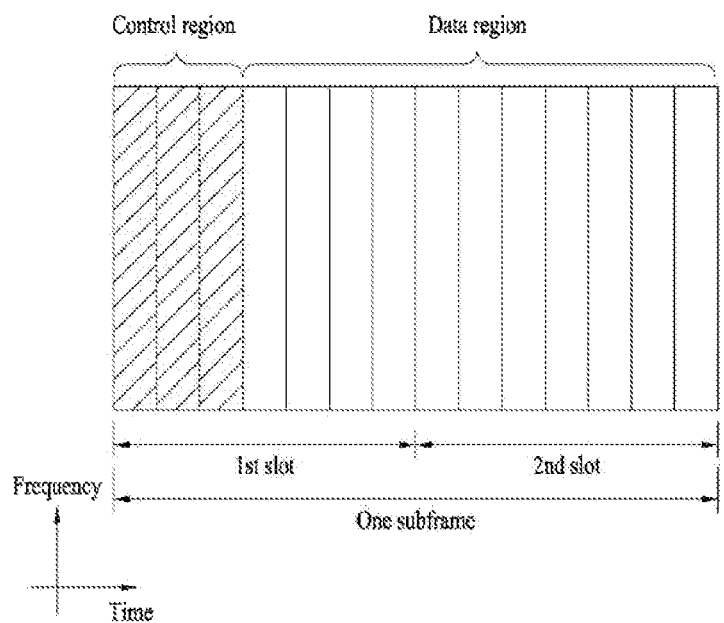
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI).

If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
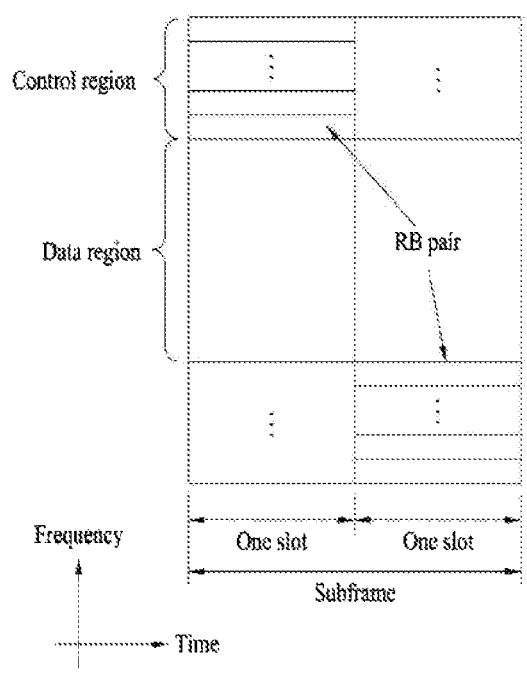
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$S = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1$, $x_2$, ..., $x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = $$ [Equation 5]

$$W\hat{s} = WPs$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T$$ [Equation 6]

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}]$$ [Equation 7]

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix}$$ [Equation 8]

An AWGN (Additive White Gaussian Noise) is added to the actual channels after a channel matrix H. The AWGN $n_1$, $n_2, \ldots, n_{N_R}$ respectively added to the NR receive antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
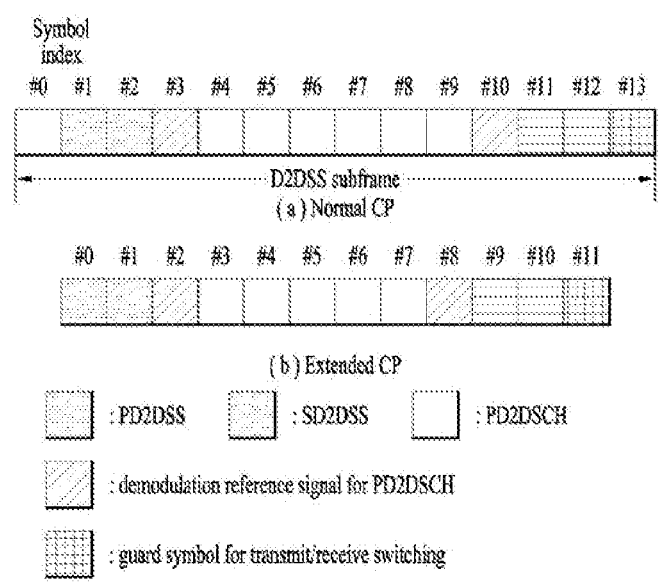
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
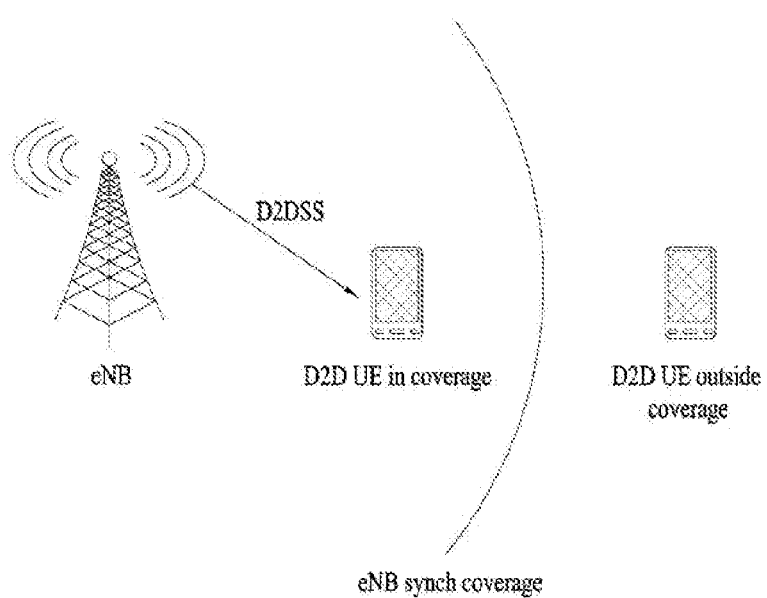
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

FIG. 8 shows an example of a UE1, a UE2 and a resource pool used by the UE1 and the UE2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the $N_F$ number of resource units and the entire time resources are divided into the NT number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
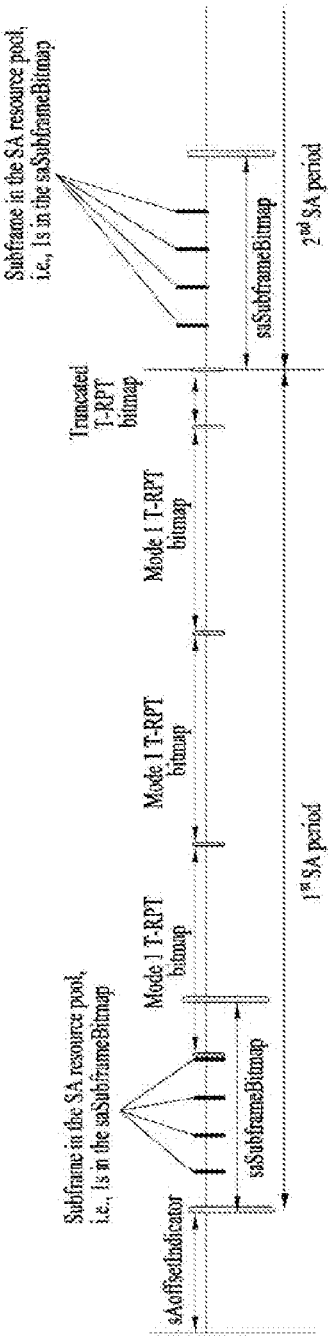
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. A transmission UE performs transmission at a position where a T-RPT bitmap corresponds to 1 in an indicated T-RPT and 4 transmissions are performed in a MAC PDU.

In the following, when a control signal and data are transmitted in the same subframe, a method of transmitting a control signal and data is explained. According to the method, it may be able to reduce inter-UE interference while diversity of the control signal is obtained. Moreover, it may be able to reduce PARR as well. In the following description, a control signal and a scheduling signal are referred to as control information (CI). All or a part of information for transmitting/receiving data such as MCS, resource allocation, Tx power, NDI (new data indicator), RV (redundancy version), retransmission number, CQO, PMI, etc. can be transmitted in a manner of being included in the CI.

Message Transmission Structure, Transmission Method

According to one embodiment of the present invention, when a message is transmitted, a format (including an RB size of SA) for transmitting SA, a location at which SA is transmitted, a scheme, an SA pool configuration, and the like can be differentiated according to a type of the message, a type of a E transmitting the message, or an transmitted BR size.

As a specific example, a scheme of multiplexing control information (SA) with a data may vary according to a message size. In particular, if a size of a message is greater than a predetermined value, control information for the message and the message are transmitted (i.e., TDM transmission) in resources distinguished from each other on a time axis. If the size of the message is less than the predetermined value, the control information for the message and the message can be transmitted (i.e., FDM transmission) in resources distinguished from each other on a frequency axis.

In this case, the message greater than the predetermined value corresponds to a periodic message and the message less than the predetermined value may correspond to an event triggered message. In particular, when a periodic message is transmitted, the periodic message is transmitted using a scheme of performing TDM on SA and data. When an event triggered message is transmitted, the event triggered message can be transmitted using a scheme of performing FDM on SA and data.

Figure 10:
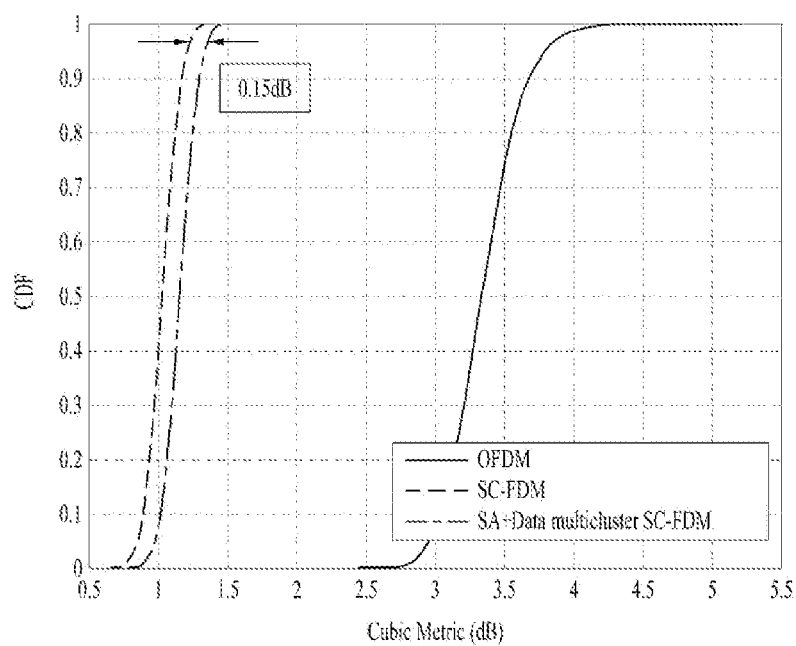
FIGS. 10 and 11 illustrate a simulation result for an impact of cubic metric according to an embodiment of the present invention.
Figure 11:
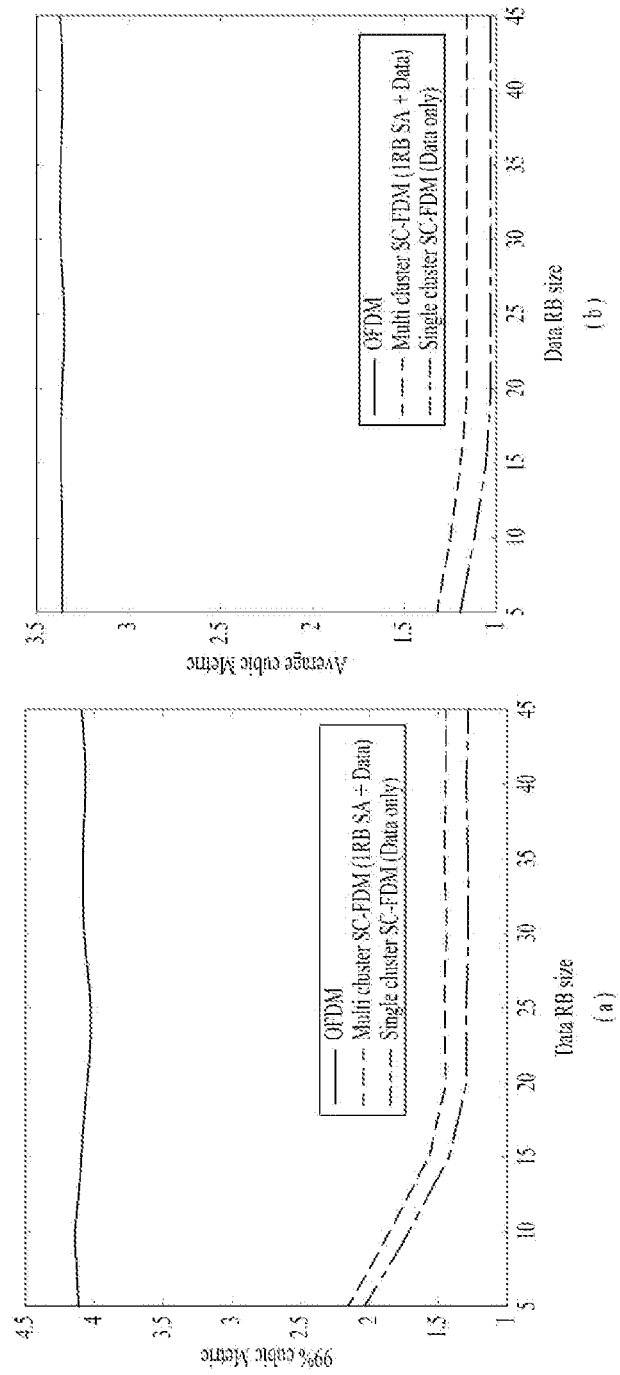

In this case, if a message of a large size (periodic message) is transmitted on a wide band and a message of a small size is transmitted on a narrow band (e.g., 1 RB), although a different multiplexing scheme is used, the loss is insignificant in terms of CM/PAPR. Specifically, referring to FIGS. 10 and 11, (multi cluster SC-FDM) cubic metric is compared with OFDM and single cluster SC-FDM when a message of a large size (or, a periodic message) is transmitted via 40 RBs and a message of a small size (or, an event triggered message) is transmitted via 1 RB. As shown in the drawings, although multi cluster SC-FDM transmission is performed while a multiplexing scheme is changed, it is able to see that a cubic metric (CM) value has almost no difference with the SC-FDM case. In particular, although narrow band transmission such as a control signal and wideband data transmission are performed at the same time, CM is not considerably increased. On the other hand, when a TDM scheme and an FDM scheme are used together, in some cases, if a message intends to secure large coverage of SA, the SA is transmitted in a manner of being TDMed with data. Otherwise, the SA and the data are transmitted in a manner of being FDMed to mitigate a half-duplex problem. In particular, if whether to transmit the SA and the data at the same time is flexibly determined according to a situation, it may be able to enhance system performance, message forwarding performance of a transmission UE, interference avoidance performance, and the like. More specifically, if the SA and the data are transmitted in a manner of being TDMed, the coverage of the SA can be widened. As a result, the number of UEs decoding the SA of a corresponding UE increases. In particular, since it is able to avoid a connected data resource after the decoding, interference avoidance performance can be enhanced.

Figure 12:
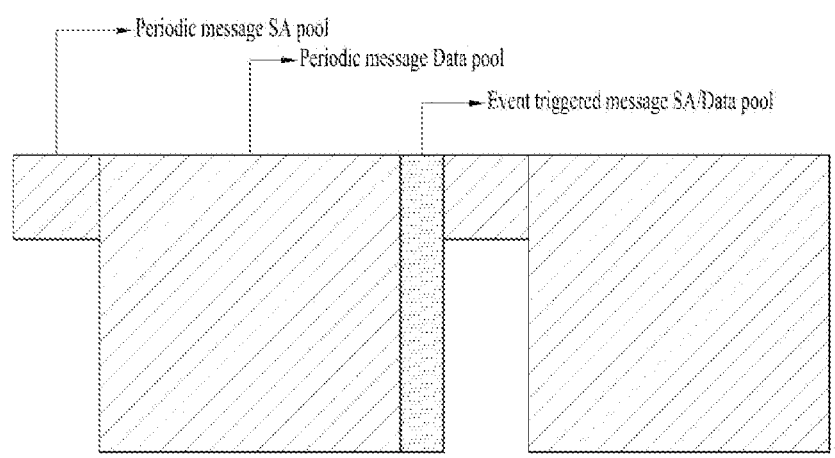
FIGS. 12 to 23 are diagrams illustrating a resource structure/resource allocation method according to an embodiment of the present invention.
Figure 13:
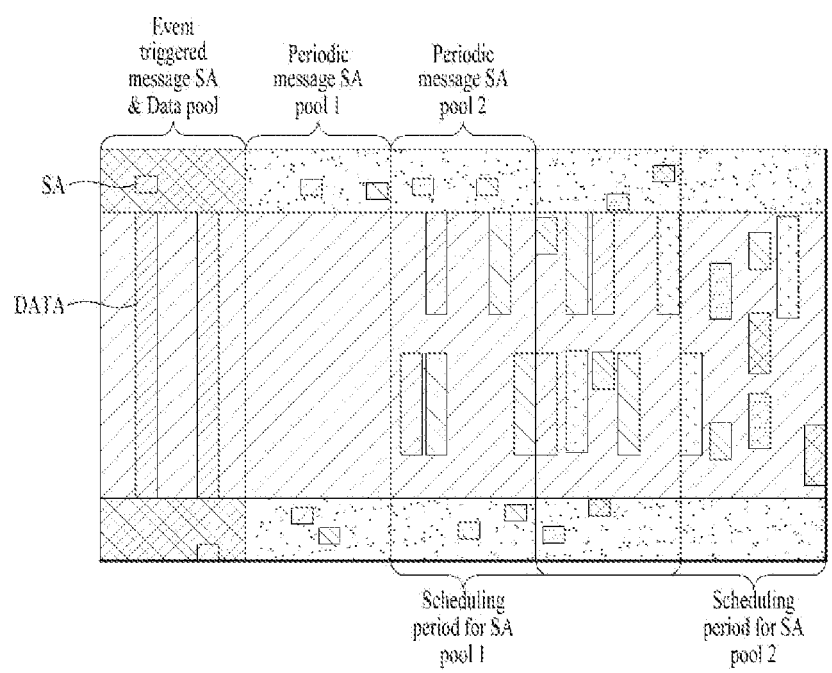

When a multiplexing scheme is differently used according to a size, a type, and the like of a message, FIGS. 12 and 13 illustrate an example of an available resource structure/resource allocation. Yet, an available resource structure is not restricted to the resource structure shown in FIGS. 12 and 13. Various resource structures rather than the resource structure shown in FIGS. 12 and 13 can be used if the resource structures are matched with the aforementioned contents.

Meanwhile, in the foregoing description, a message of a small size (or, an event triggered message) can be transmitted using an FDM scheme. In this case, schemes described in the following can be used as the FDM scheme. Of course, each of various resource structures/allocation schemes described in the following can configure an independent embodiment.

Figure 14:
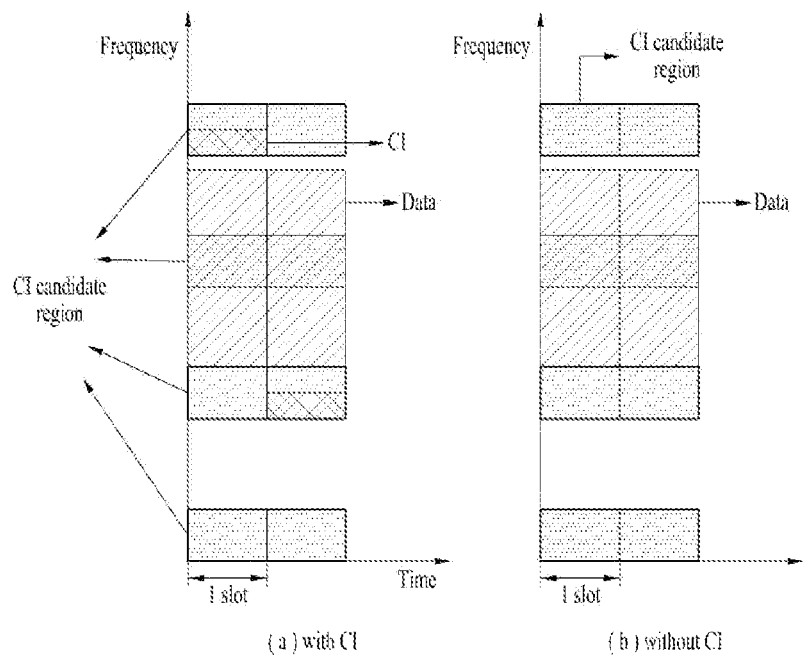

Referring to FIG. 14, CI candidate regions are determined in advance and CI is transmitted from one of the CI candidate regions. When control information and a message are transmitted in resources distinguished from each other on a frequency axis, control information for a message is transmitted in at least one or more regions among a plurality of candidate regions configured in advance. To this end, a partial resource region separated from a frequency domain is preconfigured as a region capable of transmitting CI and Rx UEs can perform blind decoding on the CI in the region. In this case, a preconfigured candidate region may include slots on a time axis and the predetermined number of RBs on a frequency axis.

A position of a candidate region in which control information is included in a second slot can be restricted by a position of a candidate region in which control information is included in a first slot. For example, CI of a second slot can be transmitted in i) a CI region included within +/−N1 RB, ii) a region within +N2 RB, or iii) a region within −N3 RB on the basis of a CI position in a first slot. In this case, the N1, the N2, and the N3 may correspond to predetermined values. The regions mentioned earlier in i) to iii) can be differently determined depending on a position of CI in the first slot. In order to satisfy single carrier property in SC-FDMA scheme, it is necessary for the regions to be contiguous each other in frequency domain. Hence, it may be able to set a limit on a CI position of the second slot.

In this case, a position at which data is transmitted can be independently configured irrespective of CI or can be determined in a manner of being interlocked with a position of the CI. The CI may or may not explicitly indicate RA of data.

In order to prevent a UE from performing data decoding (or, blind decoding) in a region considerably deviated from a position at which CI is actually transmitted, it may apply at least one rule among rules a) to d) described in the following.

a) Data is not transmitted in a frequency resource position at which CI is transmitted.

b) Data can be transmitted in i) a region within +/−K1 RB, ii) a region within +K2 RB, or iii) a region within −K3 RB in an RB in which CI is transmitted. In this case, the K1, the K2, and the K3 may correspond to predetermined values. The conditions (i to iii) can be differently applied depending on a position at which CI is transmitted. This rule is applied to prevent a case that CI and data are transmitted in a manner of being considerably apart from each other. For example, it may be able to determine a rule that data is to be continuously transmitted in RB indexes only in + direction on the basis of a position at which CI is transmitted. If the rule is applied, an Rx UE can implicitly identify a start RB of a position at which data is transmitted through the position at which the CI is transmitted. In the aspect of a Tx UE, when a UE determines a position at which data is transmitted, it may be able to determine a rule that CI is to be transmitted in a lowest RB index in the position at which the data is transmitted (of course, the RB corresponds to an RB configured to transmit the CI).

c) CI of a second slot is not transmitted at a frequency position identical to a CI position of a first slot.

d) CI is not located in the middle of a data RB. Or, a center RB of the entire frequency band is not included in a plurality of the preconfigured candidate regions. This rule is applied to prevent PAPR from being excessively increased by setting a limit on the number of clusters to 3 although CI and data generate an independent SC-FDM signal.

An Rx UE may not perform data decoding in a region in which data is not transmitted in consideration of at least one of a) to d).

Subsequently, CI of a first slot and CI of a second slot can be independently determined. In this case, it may be able to determine a rule that a case of transmitting CI at the same frequency position of the two slots is to be excluded in advance. In particular, a candidate region in which control information is included in the second slot and a candidate region in which control information is included in the first slot can be positioned at a different frequency band. A UE may perform blind decoding on CI in the first slot and the second slot, respectively. In this case, in order to prevent excessive blind decoding, it may be able to set a limit on the number of candidate CIs according to a slot. For example, when BD is performed as many as a number equal to or less than X times in each subframe, the maximum CI number according to a slot can be determined by floor (sqrt (X)).

In the foregoing description, if two or more RSs are deployed to a single slot, slot hopping can be applied to data as well. In this case, the rule b) can be independently applied according to a slot.

Figure 15:
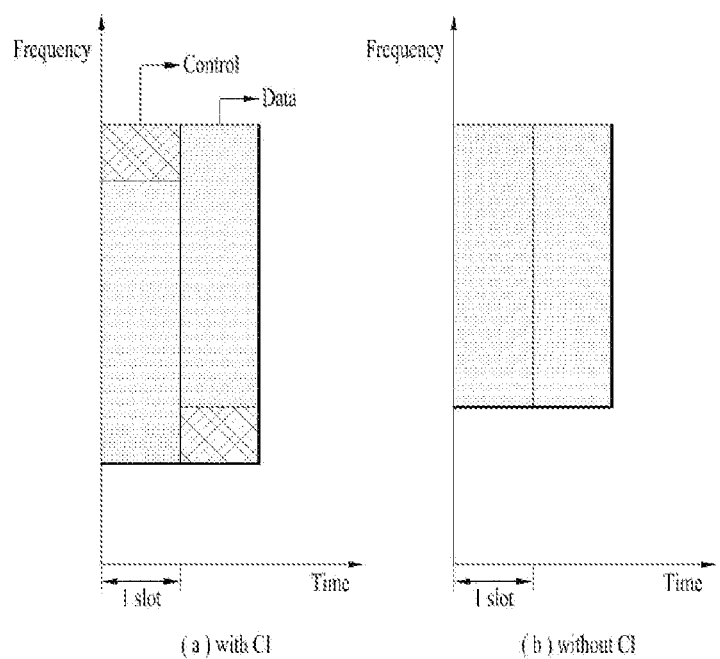
Figure 16:
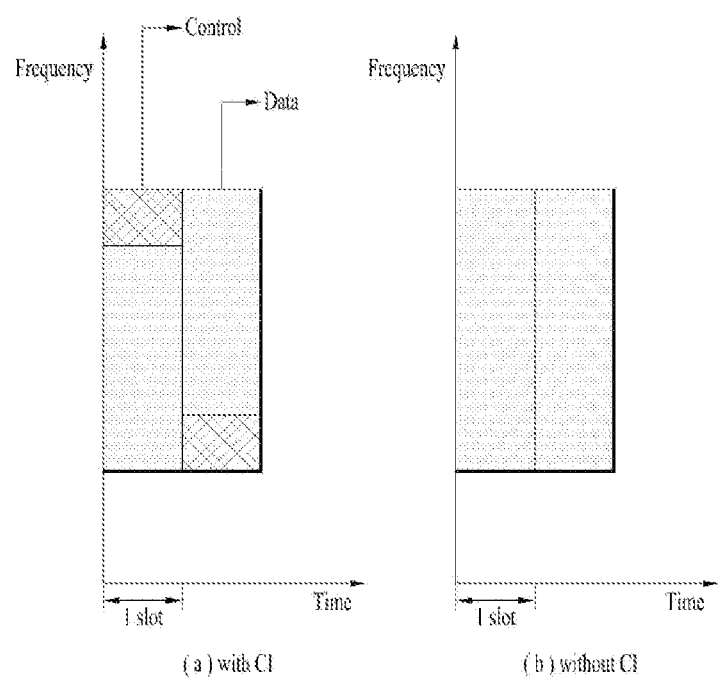
Figure 17:
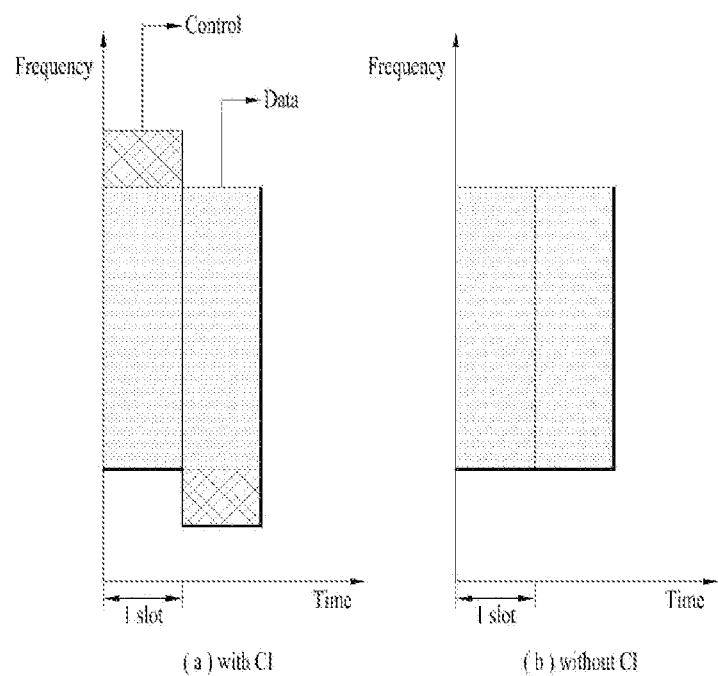

Subsequently, FIGS. 15 to 17 illustrate a method of transmitting a V2X channel by reusing a slot hopping structure similar to PUCCH and a PUSCH structure. In this case, it is preferable to transmit CI and data in a manner of making the CI and the data to be adjacent to each other to reduce in-band emission to a different UE. More specifically, it may be able to reduce an in-band emission component (EVM shoulder) which occurs near an allocated RB.

Specifically, CI is deployed while hopping between slots and data is deployed between CIs. In particular, CIs are adjacent to each other in frequency domain and a position at which CI is transmitted is changed according to a slot. CI and/or data can be transmitted using a legacy PUCCH structure or a PUSCH structure. For example, CI uses 2 RSs per slot similar to a PUCCH format 2/3 and data uses 1 RS per slot similar to a PUSCH. CI and/or data can be transmitted using a legacy PSCCH structure or a PSSCH structure. Or, CI and/or data can be transmitted using a modified PSCCH/PSSCH structure (puncturing or rate matching is performed on the last symbol). In this case, puncturing is performed on a partial symbol only instead of the whole of the last symbol. Or, in order to cope with high mobility, a DMRS can be additionally deployed.

In this case, an Rx UE performs blind decoding on CI in each slot to identify a position of data. When RA information is explicitly included in CI, if a UE performs blind decoding on a position of the CI, a final confirm can be performed via CI contents. When CI is transmitted according to a slot, the CI can be transmitted in a form that the same RV is repeated. Similar to incremental redundancy, a different RV can be transmitted according to a slot (e.g., first slot RV 0, second slot RV 1). In this case, a data RE can be mapped using one of three methods described in the following.

As a first method, encoding and modulation symbols are mapped to 2 slots except a CI region according to a determined RB size. When data is actually mapped to an RE, the data is mapped in a manner of being shifted as many as RBs (or, a group of REs, when CI fails to fill a specific RB) occupied by the CI region according to a slot. In other word, data generates a codeword under the assumption that there is no CI and the data is mapped in a manner of shifting a first slot or a second slot as much as a region occupied by CI in a subframe in which the CI is transmitted. FIG. 15 illustrates the abovementioned mapping method. The mapping method corresponds to a method of dynamically changing a data RE according to whether or not CI is transmitted.

As a second method, as shown in FIG. 16, a data RE is mapped until a CI region. If CI is transmitted, it may perform rate matching on a CI part. According to the present method, a codeword is generated in consideration of a case of not transmitting CI in every subframe. Then, rate matching is performed on a CI region in a subframe in which CI is transmitted. The present method has a merit in that an RB size is the same irrespective of whether or not CI is transmitted.

As a third method, as shown in FIG. 17, data is mapped in the same frequency position during 2 slots and CI can be mapped to a position near an RB in which the data is transmitted. The present method has a merit in that it may have data codeword to RE mapping irrespective of whether or not CI is transmitted. Yet, since the CI is transmitted to a position near a data region, an effective RB size may change.

According to the aforementioned three methods, although CI is deployed at the top in a first slot (CI is deployed at a side where an RB index is high), an opposite case is available as well. In particular, CI can be deployed at the bottom in the first slot and CI can be deployed at the top in a second slot.

Figure 18:
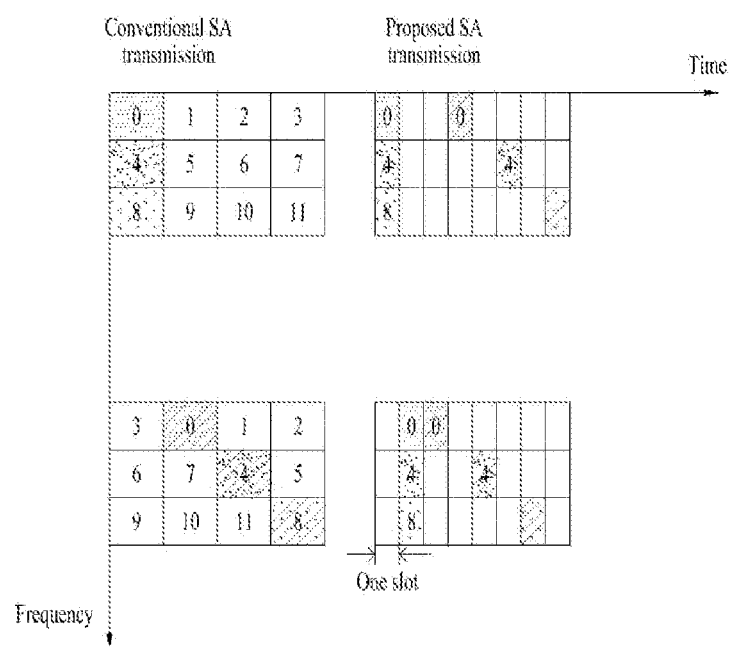

Meanwhile, the slot hopping scheme of the CI can be applied in a manner that a slot is hopped in an SA pool in a legacy D2D operation. In particular, according to 3GPP Rel. 12/13, SA performs transmission two times in each SA pool. In this case, due to a half-duplex constraint, it may be able to receive one transmission only among the two SA transmissions. In this case, since it is unable to obtain a frequency diversity gain, SA reception performance can be considerably degraded. In this case, if slot hopping is permitted, since it is able to obtain the frequency diversity gain, a probability of receiving SA can be enhanced. FIG. 18 illustrates an embodiment of performing SA slot hopping. A slot hopping operation of the SA can be configured by a network. Or, whether a slot hopping is enabled or disabled can be determined in advance. When an in-coverage UE has a small frequency offset, a UE has a small frequency offset due to a low speed of the UE (e.g., a pedestrian UE), or a big frequency offset or Doppler shift occurs, the slot hopping operation can be selectively applied to a case that two or more DMRSs of SA are deployed according to a slot.

Figure 19:
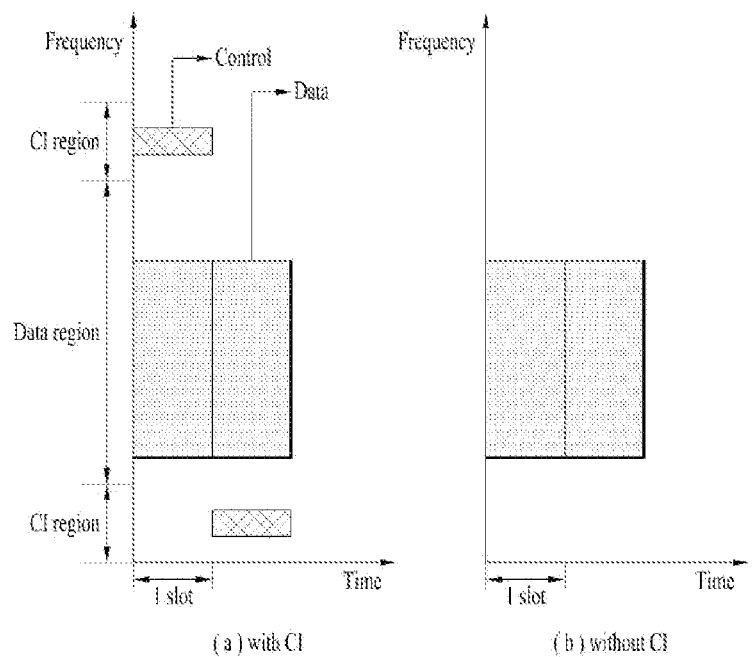
Figure 20:
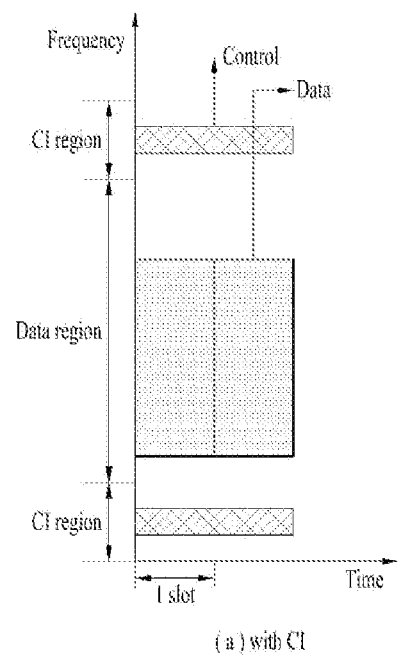

FIGS. 19 and 20 illustrate an example for a scheme of independently transmitting CI and data. In particular, CI is deployed at an edge of a bandwidth and data is deployed at a region in which data is transmitted together with PUSCH. In this case, a region in which the CI is transmitted and a region in which the data is transmitted can be determined in advance or can be signaled by a network via physical layer signaling or higher layer signaling. FIG. 19 illustrates an embodiment for the present scheme. Or, as shown in FIG. 20, it may not apply slot hopping while diversity of control is obtained. This method can be applied when 3-cluster transmission is available but PAPR increase is not that big due to a small size of an RB size of a control region. In this case, CI, which is transmitted in a manner of being separated in frequency domain, can include the same information. In this case, the CI can be transmitted by applying separate DFT precoding to the CI. Or, the CI can be transmitted by applying single DFT precoding to the CI in a form of being separated in frequency domain only. When the CI is separated from frequency domain in a CI region, a frequency domain offset can be applied to the CI. In this case, a frequency domain offset of the same size can be applied to all CI resources. Hence, although a CI resource is transmitted at any CI region, it may be able to make the CI resource have the same frequency domain diversity.

Figure 21:
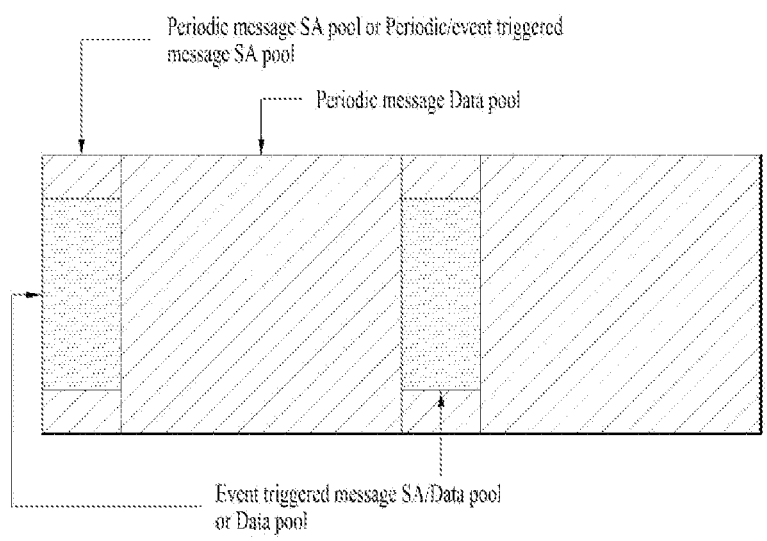
Figure 22:
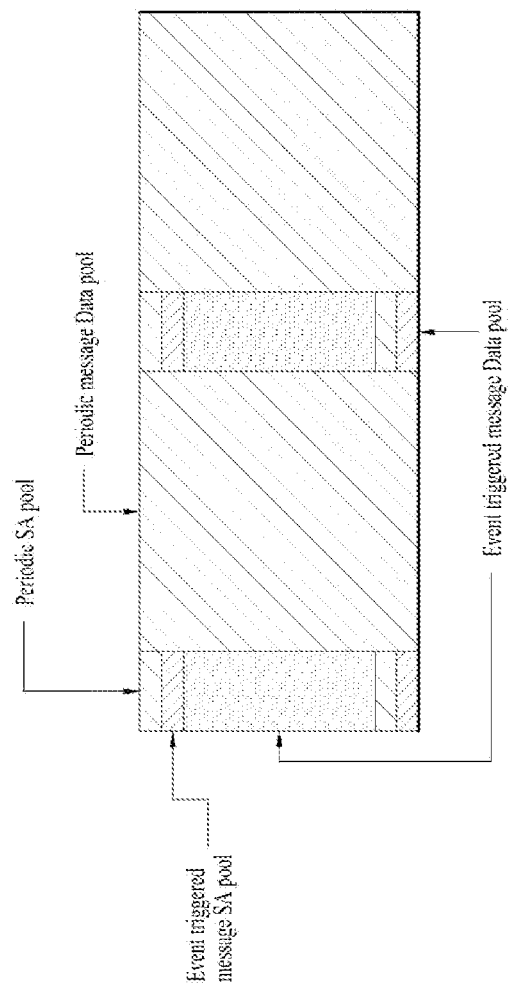
Figure 23:
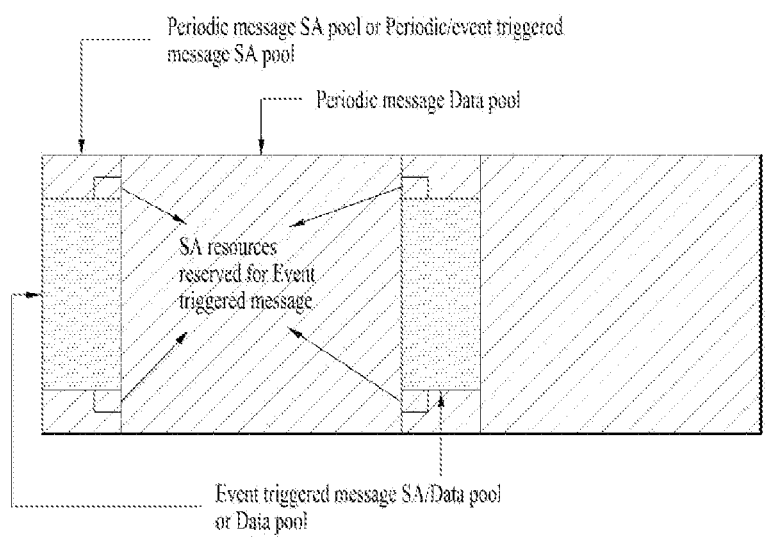

Subsequently, FIGS. 21 to 23 illustrate a scheme of configuring a pool of an event triggered message and an SA pool in the same subframe. In this case, if SA of a periodic message and data are TDMed and a pool of the SA is configured by a size for solving HDC, as shown in FIG. 17, it may solve a problem of wasting a frequency resource of the SA pool. Specifically, a partial SA resource of the SA pool can be reserved for the usage of transmitting an event triggered message or a UE transmitting an event triggered message may select an SA resource to transmit the event triggered message. When the partial SA resource of the SA pool is reserved for the event triggered message, the partial SA resource of the SA pool can be randomly determined in every period. Or, the partial SA resource of the SA pool can be determined by a hopping pattern, which is determined by a specific ID or a parameter indicated by a network via higher layer signaling. Or, it may be able to partly configure an SA pool for an event triggered message irrespective of an SA pool for a periodic message. Or, in case of implicitly transmitting an event triggered message, a periodic message is not transmitted in a corresponding SA period. In this case, the event triggered message can be indicated using legacy SA. In this case, application of T-RPT is excluded and data is transmitted in a subframe in which SA is transmitted. Frequency RA and MCS can be indicated via SA. Or, RA of an event triggered message is determined in a manner of being dependent on a fixed or SA pool size (e.g., remaining frequency region of SA pool or a part of the remaining frequency region corresponds to an event triggered message transmission size). In this case, MCS can be transmitted in a piggyback form.

Contents Included in Control Information

In the following, contents included in SA are explained.

An ID and a source (group) ID field can be included in SA. This field can be used as a seed value that enables a UE to have a different hopping pattern according to a source for T-RPT randomization. Or, the ID can be originated from a destination ID of a higher layer. In this case, since a scheme of selecting an ID included in the SA is different according to a UE, an ID can be included in the SA in a manner that a transmission UE generates a different ID.

An ID may not be included in SA contents to reduce a bit field of the SA. In this case, all or a part of a DMRS base sequence, CS (cyclic shift), OCC, and a scrambling sequence can be determined using a different field rather than the ID. In this case, all or a part of RA, MCS, a priority level, a next reservation section length (a position of a resource to be transmitted next on the basis of a current transmission resource), a timing offset between SA and data, T-RPT, a retransmission number, and the like can be utilized. For example, the RA field can be used for generating an RS/scrambling sequence. In this case, there is a possibility that UEs using the same resource use the same RS. Hence, it may differently configure CS and/or OCC using a different field (all or a part of MCS, priority level, reservation section length, etc.) to make RSs to be orthogonal to each other.

Or, when the ID is included in the SA, the ID can be transmitted with a reduced length. In this case, since the ID length is not sufficient, a collision may occur between an RS and a scrambling sequence. Hence, the RS/scrambling sequence can be generated using all or a part of the ID field. Or, the ID can be transmitted in a manner of being masked by a CRC field without being explicitly transmitted. In this case, it may determine a rule that combining is performed on the same SA ID (or, CRC ID) only. Meanwhile, for example, a CRC field can be masked with a predetermined ID and an RS/scrambling sequence can be generated using the CRC field itself. And, an RS/scrambling sequence generated for data can be determined using all or a part of fields transmitted to a CRC ID and/or SA. In other word, the RS/scrambling sequence of data is generated using a 'predetermined partial filed' included in the SA (a field to be used for generating the RS/scrambling sequence of data should be determined in advance). In this case, a CRC field can be appropriately used for generating the RS/scrambling sequence of data. The CRC field is differently generated according to information of a different field included in the SA. The CRC field can be used for checking whether or not there is an error in data. In this case, if the SA includes contents different from each other, CRC fields of UEs may vary. In particular, each of UEs can differently generate an RS/scrambling sequence of data using a different CRC field. As a different embodiment, while a partial ID is explicitly included, the remaining ID can be transmitted in a manner of being masked with a CRC (or, using a partial bit sequence of a CRC field). In this case, it may be able to determine a rule that an RS sequence/scrambling sequence of data is generated using all or a part of an explicit ID, an ID masked with a CRC (or, a CRC field itself), and a field transmitted in a manner of being included in SA. Or, an RS sequence and a scrambling sequence can be generated using all or a part of an ID and a specific field included in SA. In this case, although it is able to use the ID to distinguish UEs from each other, the ID may also provide a help to a reception UE when the reception UE performs a HARQ combining operation. According to a legacy LTE release 12/13 D2D, a DMRS sequence/scrambling sequence is generated using an ID included in 8-bit SA. In order to perform an additional randomization operation, a DMRS sequence and a scrambling sequence can be generated using ID N bits and M bits of a different field. For example, a DMRS sequence and a scrambling sequence can be generated by combining an ID of 8 bits with 8 bits of a different field included in SA.

A UE type field can be included in the SA. Specifically, information indicating a P-UE, a V-UE, or an RSU can be included in the SA. If a pool is divided, the information may not be included in the SA. Yet, when cellular timing is different from GPS timing or timing is different between cells while using the cellular timing, if overlap occurs between pools, the information can be included in the SA.

A priority level field (a message type or a message size) can be included in the SA. If an SA pool is divided, the priority level filed may not be included in the SA.

MCS can be included in an SA field. In this case, 64QAM can be excluded from an MCS value. Since it is not necessary for UEs to implement 64QAM, UE implementation can be simplified. Yet, in order to improve performance between links in future sidelink (D2D) communication, 64QAM can be included in the MCS.

A hopping flag can be included in the SA field. Since the hopping flag is included in a legacy SA field, it is regarded as the hopping flag is necessary. However, if wideband transmission is performed, since the hopping flag field is unable to obtain performance gain, the hopping flag field can be used as a different usage. For example, when a message of a big size is transmitted by combining event triggered messages or a plurality of messages or an RB size is equal to or greater than a prescribed threshold, the hopping flag field can be used for designating different information. For example, when a transmitted message corresponds to an event triggered message, the hopping flag field can be used as an indicator indicating wideband transmission or a message for forwarding a plurality of narrow band signals (e.g., by RSU). Or, when SA is transmitted in every data transmission or SA indicates a HARQ process number and RV of data, if a resource is selected via separate sensing according to each transmission, it may not apply frequency hopping. In this case, it may not transmit a hopping flag in the SA.

A slot hopping flag field can be included in the SA. The slot hopping flag field corresponds to a field for indicating whether or not slot hopping of data is performed. The slot hopping flag field can be configured by a network. If the slot hopping flag field is preconfigured, the slot hopping flag field may not be included in the SA.

An RA (resource allocation) field can be included in the SA.

In relation to RA information on a frequency axis, an RA bit size can be reduced according to the number of subchannels. For example, when a frequency resource is divided into the N number of subchannels, if it is assumed that overlap is prohibited between subchannels, bits as many as ceil (log 2(N*(N+1)/2)) are necessary. In particular, it may have a merit in that it is able to reduce the number of bits in an RA field in a legacy RB unit. If data and SA are FDMed, in particular, if SA and data are continuously FDMed, a start frequency position can be indicated by a positon of the SA. Hence, it may be able to reduce more bits. For example, if a position of an end RB is indicated only and a frequency resource is divided into subchannels, an RA field as much as ceil(log 2(N)) is required only. Meanwhile, since a method of reducing the RA field is able to perform various RAs, similar to a legacy method, the method can be indicated in a unit of RB. In order to make UEs perform a common operation in a specific operation, resource allocation can be performed in an RB unit. Yet, a practically used resource can be allocated in a unit of a specific subchannel. A network can signal a resource allocation unit to UEs via physical layer signaling or higher layer signaling. The abovementioned operation can be used not only for a resource allocation operation but also for an energy sensing operation or a resource reselection operation. In particular, a resource selection/reselection/sensing operation can be performed in a resource unit signaled by the network.

If continuous transmission is assumed in relation to RA information on a time axis, a bit size can be reduced. Yet, T-RPT bit can be used similar to a legacy method. In this case, in order to make each UE have a different hopping pattern, it may add a randomization seed value. If the aforementioned ID field is not used, it may add a separate T-RPT randomization field. It may indicate a repetition number per MAC PDU only or it may indicate (total transmission opportunity+repetition number per MAC PDU). All or a part of 1, 2, 4, 8, and 16 can be indicated as a repetition number. Or, a field indicating the number of SA periods during which SA is maintained, a field indicating the timing at which an RA of SA is applied, and a field indicating the timing (or, SA period) at which T-RPT starts can be included. Or, the number of MAC PDUs transmitted via SA can be included.

Meanwhile, RS sequence hopping can be used for SA or data. In this case, current RS hopping is configured to be changed according to a slot. If the number of RSs in a subframe/TTI exceeds 2, sequence hopping may vary according to an RS or a slot. If the sequence hopping varies according to an RS, a different sequence is used according to an adjacent RS. If the sequence hopping varies according to a slot, an RS included in a slot uses the same base sequence. In the latter case, since the same sequence is transmitted within a slot, if a frequency offset is big, it is able to assume that the same sequence is transmitted in the same slot when interpolation is performed between RSs, thereby increasing performance. In the former case, since a different RS sequence is used, if a frequency offset including a very big sequence occurs, the sequence is randomized. Hence, it may have a merit in that an impact of ICI within a symbol is relatively cancelled. Meanwhile, the abovementioned RS hopping scheme or information on whether or not hopping is performed can be differently configured according to a sidelink channel. For example, in case of SA, it may be able to configure an RS sequence to be hopped between slots. In case of data, it may vary (hop) according to an RS sequence. In case of data, a seed ID for sequence hopping can be indicated by the SA.

Information indicating eNB timing or GNSS timing can be included in PSBCH contents or a PSSID. Or, SA can be transmitted with the GNSS timing and data can be transmitted with the eNB timing in the in coverage (DL timing or UL timing). In this case, an offset between the GNSS timing and the eNB timing can be signaled by including the offset in the SA.

A reserved bit can be included in the SA field. For example, when a cross carrier operation is performed, a carrier indication field indicating a carrier on which data is transmitted after SA transmission can be included in the SA. Or, a reserved field can be included in the SA for a field indicating a carrier on which RV is transmitted and retransmission is performed after SA transmission. A length of the reserved bit included in the SA can be determined in advance or can be signaled by a network via physical layer signaling or higher layer signaling.

TA is not included in the SA. In case of a mode 1 (or, an eNB-based scheduling mode), since transmission is performed with DL timing or GNSS timing and a TA bit field size corresponding to 11 bits is relatively big, it may be preferable to exclude the TA field from the SA to secure a coding rate. In case of the mode 1, when a UE performs transmission with reference to the GNSS timing, it is not necessary for the UE to have the TA field. Yet, if a UE uses cellular timing and the mode 1, the TA field can be included in the SA. For any other cases, the TA field is not used or can be set to all zeros. In particular, in case of using the mode 1, if transmission is performed with reference to the GNSS timing, the TA field is not used or is set to all zeros. As an exceptional operation in the mode 1, a timing reference (GNSS or eNB) can be configured in advance according to an SA resource pool to determine whether or not a UE uses the GNSS timing. If an SLSS ID of SLSS associated with an SA pool uses a resource reserved for the GNSS, a UE is able to know that a signal received in the SA pool does not use the TA field although a mode corresponds to the mode 1.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

Figure 24:
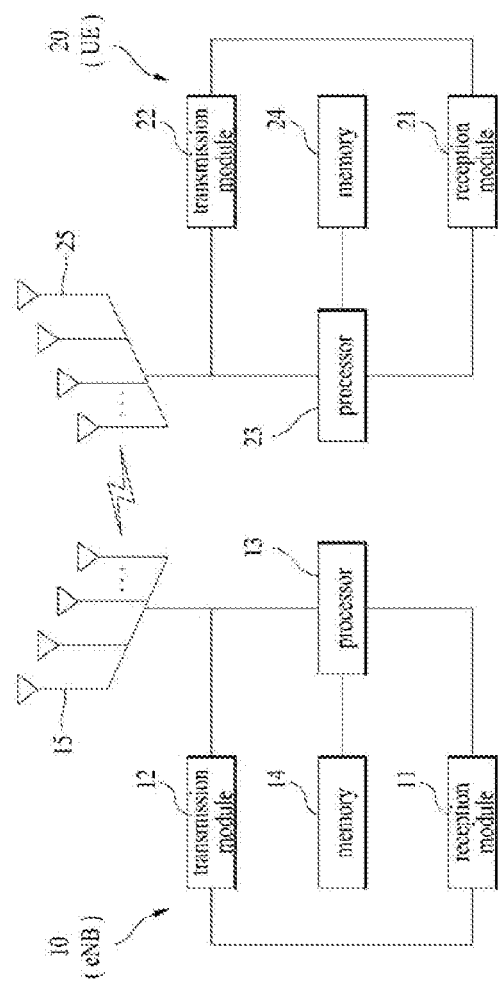
FIG. 24 is a diagram for configurations of a transmitter and a receiver.

FIG. 24 is a diagram for configurations of a transmitter and a receiver.

Referring to FIG. 24, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 24, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 24 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention.

Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method for a user equipment (UE) in a wireless communication system, comprising;
    transmitting, by the UE, a Physical sidelink control channel (PSCCH);
    transmitting, by the UE, a Physical sidelink shared channel (PSSCH) related to the PSCCH,
    wherein a sequence for the PSSCH is based on a value related to a Cyclic redundancy check (CRC).
2. The method of claim 1, wherein the sequence is a reference signal sequence for the PSSCH.
3. The method of claim 1, wherein the sequence is a scrambling sequence for the PSSCH.
4. The method of claim 1, wherein the CRC is a CRC on the PSCCH.
5. The method of claim 1, wherein the UE is capable of communicating with at least one of another UE, a UE related to an autonomous driving vehicle, a base station (BS) or a network.
6. A user equipment (UE) in a wireless communication system, comprising:
    at least one processor;
    at least one computer memory operably connectable to the at least one processor and storing instructions that, when executed, cause the at least one processor to perform operations comprising:
        transmitting, by the UE, a Physical sidelink control channel (PSCCH);
        transmitting, by the UE, a Physical sidelink shared channel (PSSCH) related to the PSCCH,
        wherein a sequence for the PSSCH is based on a value related to a Cyclic redundancy check (CRC).
7. The UE of claim 6, wherein the sequence is a reference signal sequence for the PSSCH.
8. The UE of claim 6, wherein the sequence is a scrambling sequence for the PSSCH.
9. A processor for transmitting a Physical Sidelink Shared Channel (PSSCH) in a wireless communication system,
    wherein the processor is configured to perform operations for a user equipment (UE),
    wherein the operations include:
        transmitting, by the UE, a Physical sidelink control channel (PSCCH); and
        transmitting, by the UE, the PSSCH related to the PSCCH, and
        wherein a sequence for the PSSCH is based on a value related to a Cyclic redundancy check (CRC).
10. The processor of claim 9, wherein the sequence is a reference signal sequence for the PSSCH.
11. The processor of claim 9, wherein the sequence is a scrambling sequence for the PSSCH.
12. A non-transitory computer-readable storage medium storing at least one computer program including instructions which, when executed by at least one processor, cause the at least one processor to perform operations for a first user equipment (UE),
    wherein the operations include
        transmitting, by the UE, a Physical sidelink control channel (PSCCH);
        transmitting, by the UE, a Physical sidelink shared channel (PSSCH) related to the PSCCH,
        wherein a sequence for the PSSCH is based on a value related to a Cyclic redundancy check (CRC).
13. The non-transitory computer-readable storage medium of claim 12, wherein the sequence is a reference signal sequence for the PSSCH.
14. The non-transitory computer-readable storage medium of claim 12, wherein the sequence is a scrambling sequence for the PSSCH.

* * * * *